(12) United States Patent
Zeng et al.

(10) Patent No.: US 11,923,551 B2
(45) Date of Patent: Mar. 5, 2024

(54) BATTERY CELL, BATTERY, ELECTRIC APPARATUS, AND MANUFACTURING METHOD AND SYSTEM OF BATTERY CELL

(71) Applicant: CONTEMPORARY AMPEREX TECHNOLOGY CO., LIMITED, Ningde (CN)

(72) Inventors: Yuqun Zeng, Ningde (CN); Chengyou Xing, Ningde (CN); Wenlong Kang, Ningde (CN); Huasheng Su, Ningde (CN); Quankun Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/048,454

(22) Filed: Oct. 21, 2022

(65) Prior Publication Data

US 2023/0125202 A1    Apr. 27, 2023

Related U.S. Application Data

(63) Continuation of application No. PCT/CN2020/119688, filed on Sep. 30, 2020.

(51) Int. Cl.
*H01M 50/152*    (2021.01)
*H01M 10/04*    (2006.01)
*H01M 50/164*    (2021.01)

(52) U.S. Cl.
CPC ..... *H01M 50/152* (2021.01); *H01M 10/0409* (2013.01); *H01M 50/164* (2021.01)

(58) Field of Classification Search
CPC ............. H01M 50/152; H01M 50/164; H01M 10/0409

See application file for complete search history.

(56) References Cited

U.S. PATENT DOCUMENTS

2013/0224546 A1    8/2013    Hama et al.

FOREIGN PATENT DOCUMENTS

| CN | 105374961 A | 3/2016 |
|---|---|---|
| CN | 105470413 A | 4/2016 |

(Continued)

OTHER PUBLICATIONS

CN107482156A translation (Year: 2017).*

(Continued)

*Primary Examiner* — Jane J Rhee
(74) *Attorney, Agent, or Firm* — Kilpatrick Townsend & Stockton LLP

(57) ABSTRACT

Embodiments provide a battery cell, a battery, an electric apparatus, and a manufacturing method and system of battery cell. In those embodiments, the battery cell includes a housing, an electrode assembly, and an end cover assembly. The housing provides an opening. The electrode assembly is disposed in the housing. The electrode assembly includes a body portion and a tab. The tab extends from an end of the body portion to the opening. The electrode assembly includes a first electrode plate, a second electrode plate, and a separator. The first electrode plate and the second electrode plate each have a coated area and an uncoated area. A part of the electrode assembly corresponding to the coated areas of the first electrode plate and the second electrode plate is the body portion. The uncoated area of the first electrode plate or the second electrode plate forms the tab.

14 Claims, 15 Drawing Sheets

(56) References Cited

FOREIGN PATENT DOCUMENTS

| | | | | |
|---|---|---|---|---|
| CN | 107482156 | A | * 12/2017 | ........ H01M 10/0587 |
| CN | 107482156 | A | 12/2017 | |
| CN | 108370020 | A | 8/2018 | |
| CN | 208570676 | U | 3/2019 | |
| CN | 111326699 | A | 6/2020 | |
| CN | 210743995 | U | 6/2020 | |
| CN | 212011114 | U | 11/2020 | |
| CN | 112310561 | A | 2/2021 | |
| CN | 112310569 | A | 2/2021 | |
| JP | H1092443 | A | 4/1998 | |
| JP | 2011054380 | A | 3/2011 | |
| JP | 2015099699 | A | 5/2015 | |
| JP | 2015106533 | A | 6/2015 | |
| JP | 2018006113 | A | 1/2018 | |
| KR | 2013019713 | A | * 2/2013 | |
| KR | 20130019713 | A | 2/2013 | |
| WO | 2017038439 | A1 | 3/2017 | |
| WO | 2019051630 | A1 | 3/2019 | |
| WO | 2019148662 | A1 | 8/2019 | |

OTHER PUBLICATIONS

KR2013019713A translation (Year: 2013).*
International Search Report and Written Opinion received in PCT Application PCT/CN2020/119688 dated Jul. 14, 2021.
First examination report received in the corresponding Australian application 2020470228, dated Jun. 22, 2023.
The extended European search report received in the corresponding European application 20955800.6, dated Jul. 26, 2023.
The first office action received in the corresponding Chinese application 202080096087.0, dated Aug. 25, 2023.
The Notice of Reasons for Refusal received in the corresponding Japanese application 2022-543174, dated Jul. 26, 2023.
The examination report received in the corresponding Indian application 202217039770, dated Jul. 27, 2023.

* cited by examiner

BATTERY CELL, BATTERY, ELECTRIC APPARATUS, AND MANUFACTURING METHOD AND SYSTEM OF BATTERY CELL

CROSS-REFERENCE TO RELATED APPLICATIONS

This application is a continuation of International Application PCT/CN2020/119688, filed on Sep. 30, 2020 and entitled "BATTERY CELL, BATTERY, ELECTRIC APPARATUS, AND MANUFACTURING METHOD AND SYSTEM OF BATTERY CELL", which is incorporated herein by reference in its entirety.

TECHNICAL FIELD

The present disclosure relates to the field of battery technologies, and in particular, to a battery cell, a battery, an electric apparatus, and a manufacturing method and system of battery cell.

BACKGROUND

Rechargeable batteries have been widely used in electric vehicles, mobile devices, or electric tools due to the advantages of high energy density, high power density, large cycle count, long storage time, and the like. A battery includes a battery cell. However, during use of the battery cell, there is a problem of short circuit, which affects use safety of the battery cell.

SUMMARY

Embodiments provide a battery cell, a battery, an electric apparatus, and a manufacturing method and system of battery cell, to address short circuit of the battery cell affecting use safety.

An embodiment provides a battery cell, including a housing, an electrode assembly, and an end cover assembly.

The housing provides an opening. The electrode assembly is disposed in the housing. The electrode assembly includes a body portion, a separator, and a tab. The tab extends from an end of the body portion to the opening. The electrode assembly includes a first electrode plate, a second electrode plate, and the separator. The first electrode plate and the second electrode plate each have a coated area and an uncoated area. A part of the electrode assembly corresponding to the coated areas of the first electrode plate and the second electrode plate is the body portion. The uncoated area of the first electrode plate or the second electrode plate forms the tab. The separator is configured to isolate the first electrode plate from the second electrode plate. The end cover assembly is configured to cover the opening. The end cover assembly includes an end cover and a first insulator. The end cover is configured to cover the opening and is connected to the housing. The first insulator is disposed on a side of the end cover closer to inside of the housing. The first insulator has a concave portion. The tab is accommodated in the concave portion. At least part of an inner wall of the concave portion is disposed surrounding a periphery of the tab.

In an embodiment, the first insulator is configured to abut against a peripheral surface of the tab.

In an embodiment, the first insulator includes a body and an extension portion that are interconnected, where the body is configured to be connected to the end cover, the extension portion extends and protrudes from the body to the electrode assembly to form the concave portion, the extension portion is disposed on the periphery of the tab, and the extension portion abuts against the peripheral surface. Because the first insulator has the extension portion, during assembling, the extension portion of the first insulator can insert into a gap between the tab and the housing, so that the extension portion can guide the tab into the concave portion of the first insulator accurately. This reduces the possibility that the tab is deformed by the first insulator applying a pressing force to the tab during assembling, and allows the extension portion to protect and limit the tab earlier during assembling.

In an embodiment, the extension portion surrounds the peripheral surface of the tab, so that the extension portion can provide protective isolation for the tab.

In an embodiment, the extension portion is of a continuously extending closed-loop structure. Because an end surface of the extension portion farther away from the end cover is of a closed-loop structure, the extension portion can provide protective isolation for the tab, further improving the isolation effect. Alternatively, the extension portion is of an annular structure with a notch. The notch of the extension can provide an avoidance space.

In an embodiment, the peripheral surface includes a first area, a second area, and a third area that are continuous, where the first area is closer to the body portion than the second area, the second area connects the first area and the third area, a minimum radial dimension of the first area is greater than a maximum radial dimension of the third area, and at least part of the inner wall of the concave portion surrounds the third area. In this way, part of the tab may be located in the concave portion of the first insulator, which can shorten, for a battery cell with a same capacity, an overall dimension of the battery cell in an axial direction of the electrode assembly, thereby helping improve an energy density of the battery cell.

In an embodiment, the first insulator is configured to abut against the second area, thereby reducing the possibility of the electrode assembly moving in a direction approaching or leaving the end cover.

In an embodiment, the electrode assembly further includes a second insulator, where the second insulator is disposed surrounding an abutting area between the first insulator and the tab to isolate the abutting area from the housing. The extension portion and the second insulator can form a structure that provides double isolation and protection for the tab, which can further reduce the possibility of short-circuiting the tab and the housing due to the tab coming into contact with the housing.

In an embodiment, the second insulator is a part of the separator extending beyond the body portion and located on the periphery of the tab. In this way, no more additional second insulator needs to be disposed, thereby reducing a quantity of parts used and difficulty of assembling. In addition, because the separator is of an integral structure, the formed second insulator is not easy to fall off.

In an embodiment, the second insulator abuts against an outer side surface of the first insulator facing toward the housing, so that a contact area may be formed between the second insulator and the first insulator, so that the second insulator can block a conductive impurity.

In an embodiment, the outer side surface has a guide slope, and the guide slope is inclined to the concave portion in a direction leaving the end cover. When the electrode assembly having the second insulator is placed into the housing and then the end cover assembly is assembled, under the guidance of the guide slope, a part of the first insulator corresponding to the guide slope can easily enter a space limited by the second insulator.

In an embodiment, the second insulator is adhered to the outer side surface, which improves connection reliability and stability between the second insulator and the first insulator.

In an embodiment, the battery cell further includes a third insulator, where the third insulator is disposed surrounding the second insulator and covers a transition area between the second insulator and the outer side surface, so that the third insulator can block the conductive impurity from entering the transition area between the second insulator and the outer side surface.

The battery cell in an embodiment includes the housing, the electrode assembly, and the end cover assembly. The electrode assembly may be installed in the housing. The electrode assembly has the tab. The end cover assembly is configured to be connected to the housing. The first insulator of the end cover assembly has the concave portion. The tab is accommodated in the concave portion. At least part of the inner wall of the concave portion is disposed surrounding the periphery of the tab. The first insulator forms an isolation structure on a periphery of the tab, so that the first insulator isolates the tab from the housing. In this way, during use of the battery cell, when the tab is deformed by releasing its own elastic restoring force, if the tab comes into contact with the first insulator, the tab is blocked by the first insulator, thereby effectively reducing the possibility of short circuit caused by the tab being in overlapping contact with the housing. In addition, because the first insulator covers the tab on the periphery of the tab, and the tab is accommodated in the concave portion of the first insulator, the tab may be protected by the first insulator, so that an external conductive impurity is not easy to come into contact with the tab, thereby reducing the possibility of short-circuiting the tab and the housing due to the tab and the housing being conductively connected by the conductive impurity.

An embodiment further provides a battery, including the battery cell according to the foregoing embodiment.

An embodiment further provides an electric apparatus, including the battery cell according to the foregoing embodiment, where the battery cell is configured to provide electric energy.

An embodiment further provides a manufacturing method of the battery cell according to the foregoing embodiment, including:

providing an electrode assembly, where the electrode assembly includes a first electrode plate, a second electrode plate, and a separator, the first electrode plate and the second electrode plate each have a coated area and an uncoated area, a part of the electrode assembly corresponding to the coated areas of the first electrode plate and the second electrode plate is a body portion, the uncoated area of the first electrode plate or the second electrode plate forms a tab, and the separator is configured to isolate the first electrode plate from the second electrode plate;

placing the electrode assembly into a housing having an opening, where the tab extends from an end of the body portion to the opening; and assembling an end cover assembly having an end cover and a first insulator with the housing, where the end cover covers the opening and is connected to the housing, the first insulator is located on a side of the end cover closer to inside of the housing, the first insulator has a concave portion, the tab is accommodated in the concave portion, and at least part of an inner wall of the concave portion is disposed surrounding a periphery of the tab.

In an embodiment, the first insulator abuts against a peripheral surface of the tab.

An embodiment further provides a manufacturing system of the battery cell according to the foregoing embodiment, including:

a first assembling apparatus, configured to provide an electrode assembly, where the electrode assembly includes a first electrode plate, a second electrode plate, and a separator, the first electrode plate and the second electrode plate each have a coated area and an uncoated area, a part of the electrode assembly corresponding to the coated areas of the first electrode plate and the second electrode plate is a body portion, the uncoated area of the first electrode plate or the second electrode plate forms a tab, and the separator is configured to isolate the first electrode plate from the second electrode plate;

a second assembling apparatus, configured to place the electrode assembly having the body portion and the tab into a housing having an opening, where the tab extends from an end of the body portion to the opening; and a third assembling apparatus, configured to assemble an end cover assembly having an end cover and a first insulator with the housing, where the end cover covers the opening and is connected to the housing, the first insulator is located on a side of the end cover closer to inside of the housing, the first insulator has a concave portion, the tab is accommodated in the concave portion, and at least part of an inner wall of the concave portion is disposed surrounding a periphery of the tab.

BRIEF DESCRIPTION OF DRAWINGS

For illustrating various embodiments, accompanying drawings are provided and described briefly below. The accompanying drawings in the following description show merely some embodiments, and a person of ordinary skill in the art may still derive other drawings from the accompanying drawings for achieving embodiments in accordance with the present disclosure.

FIG. 8 is a schematic cross-sectional view of a structure along A-A in

FIG. 7.

DETAILED DESCRIPTION OF EMBODIMENTS

Figure 1:
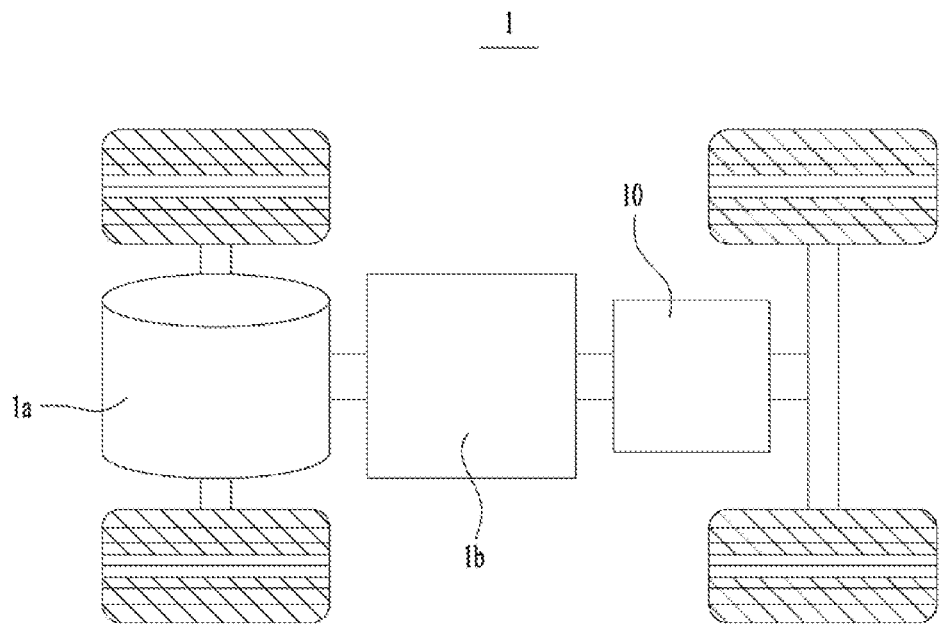
FIG. 1 is a schematic structural diagram of a vehicle disclosed in an embodiment.

The following further describes the embodiments in detail with reference to the accompanying drawings and implementations. The detailed description and accompanying drawings of the following embodiments are used to exemplarily illustrate one or more principles behind the present disclosure, and thus are not intended to limit the scope of present disclosure, that is, the present disclosure is not limited to the described embodiments.

In the descriptions herein, it should be noted that, unless otherwise stated, "a plurality of" means two or more; and the orientations or positional relationships indicated by the terms "upper", "lower", "left", "right", "inside", "outside", and the like are merely intended to help the descriptions of this application and simplify the descriptions other than indicate or imply that the apparatuses or components must have specific orientations, or be constructed and manipulated with specific orientations, and therefore shall not be construed as limitations on this application. In addition, the terms "first", "second", and "third", and the like are merely intended for a purpose of description, and shall not be understood as an indication or implication of relative importance. "Vertical" means being vertical with an allowable range of error other than being strictly vertical. "Parallel" means being parallel with an allowable range of error other than being strictly parallel.

The orientation terms appearing in the following description all are directions shown in the figures, and do not limit the specific structure of the application. In the descriptions of this application, it should be further noted that unless otherwise specified and defined explicitly, the terms "mounted", "interconnected", and "connected" should be understood in their general senses. For example, the terms may be fixedly connected, or detachably connected, or integrally connected, may be directly connected, or indirectly connected through an intermediate medium. A person of ordinary skill in the art can understand specific meanings of these terms in this application based on specific situations.

After noticing the problem of short circuit in the existing battery cells, the inventor(s) has analyzed a structure of the battery cell. A battery cell includes a housing, an electrode assembly, an end cover, an electrode terminal, and a connecting piece. The electrode assembly is disposed in the housing. The end cover is connected to the housing. The electrode terminal is disposed on the end cover. The electrode assembly includes a body portion and a tab. The tab extends from the body portion in a direction leaving the body portion. The connecting piece connects the electrode terminal and the tab of the electrode assembly. The inventor(s) has found that the tab of the battery cell is in overlapping contact with the housing, which leads to the short circuit of the battery cell. The inventor(s) has found through further research that the tab of the electrode assembly is processed through bending or flattening, so that the tab is deformed to meet assembling requirements, and therefore the tab itself can accumulate elastic restoring forces. After the battery cell is assembled, the tab does not overlap the housing to cause the short circuit. However, after use for a period of time, the tab releases the elastic restoring forces accumulated by itself and springs back, resulting in short circuit caused by the spring-back tab overlapping the housing without other structure limitations.

Based on the foregoing problem discovered by the inventor(s), the inventor(s) improves the structure of the battery cell by having the insulator of the end cover assembly abutting against the peripheral surface of the tab to reduce the possibility of the tab overlapping the housing. The following further describes the embodiments of this application.

For better understanding of this application, the following describes the Embodiments with reference to FIG. 1 to FIG. 19.

An embodiment provides an electric apparatus using a battery 10 as a power supply. The electric apparatus may be, but is not limited to, a vehicle, a ship, an aircraft, or the like. As shown in FIG. 1, an embodiment provides a vehicle 1. The vehicle 1 may be an oil-fueled vehicle, a gas-fueled vehicle, or a new energy vehicle. The new energy vehicle may be a battery electric vehicle, a hybrid electric vehicle, an extended-range electric vehicle, or the like. In this embodiment, the vehicle 1 may include a motor 1*a*, a controller 1*b*, and a battery 10. The controller 1*b* is used to control the battery 10 to supply power to the motor 1*a*. The motor 1*a* is connected to wheels through a transmission mechanism to drive the vehicle 1 to run. The battery 10 may be used as a driving power supply of the vehicle 1 to replace or partially replace fuel oil or natural gas to provide driving power for the vehicle 1. In some examples, the battery 10 may be disposed at the bottom, the front, or the rear of the vehicle 1. The battery 10 may be configured to supply electricity to the vehicle 1. In some examples, the battery 10 may be used as an operating power supply for the vehicle 1 and applied to a circuit system of the vehicle 1. For example, the battery 10 may be configured to meet power usage requirements of the vehicle 1 for starting, navigating, and operating.

Figure 2:
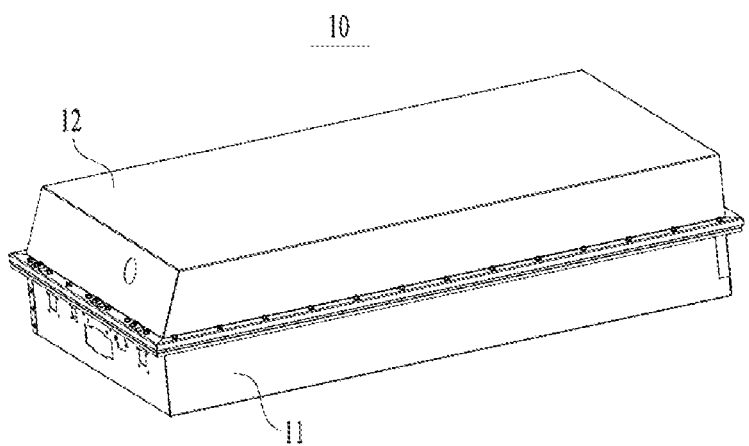
FIG. 2 is a schematic structural diagram of a battery disclosed in an embodiment.
Figure 3:
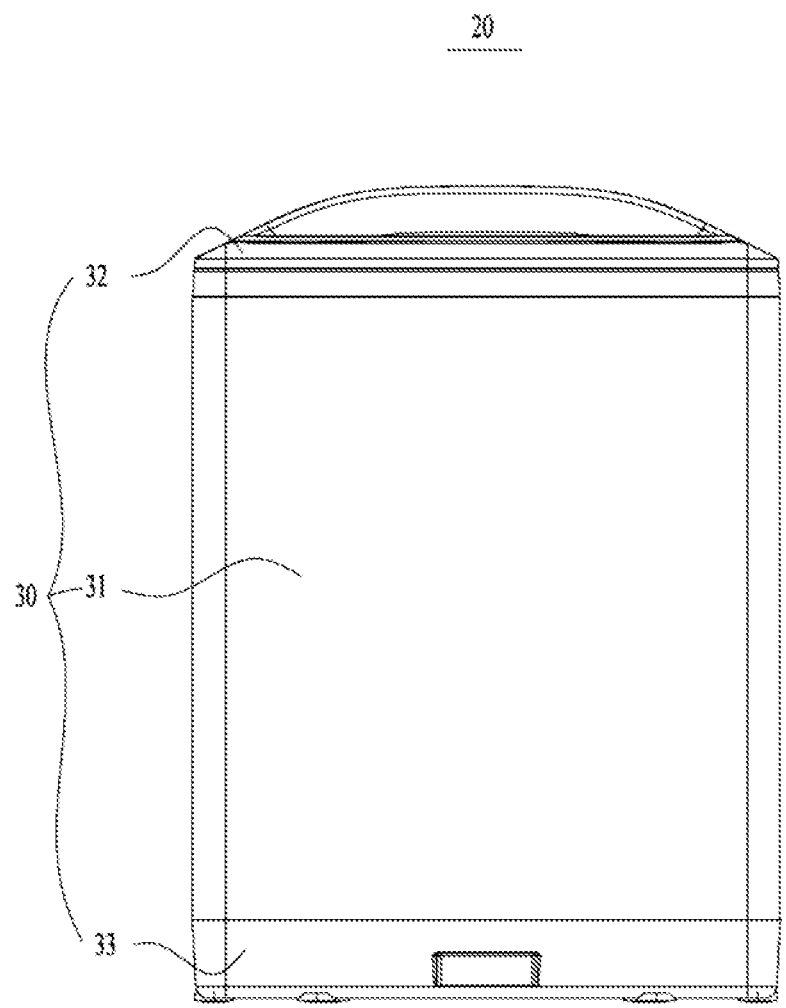
FIG. 3 is a schematic structural diagram of a battery module disclosed in an embodiment.

As shown in FIG. 2 and FIG. 3, the battery 10 includes a box body. The box body is not limited to a specific type. The box body may be a frame-shaped box body, a disk-shaped box body, a box-shaped box body, or the like. For example, the box body includes a first portion 11 and a second portion 12 that is engaged to the first portion 11. The first portion 11 is engaged to the second portion 12 to form an accommodating portion. The battery 10 includes a plurality of battery cells 40. The plurality of battery cells 40 may directly form the battery 10, or the plurality of battery cells 40 may first form battery modules 20, and then the plurality of battery modules 20 form the battery 10. FIG. 3 illustratively shows a battery module 20 according to an embodiment. The battery module 20 is disposed in the accommodating portion of the box body.

In some embodiments, to meet different power usage requirements, the battery 10 may include a plurality of battery cells 40. The plurality of battery cells 40 may be connected in series, parallel, or series and parallel, and being connected in series and parallel means a combination of series and parallel connections. In other words, the plurality of battery cells 40 may be directly disposed in the accommodating portion of the box body to form the battery 10. The battery cell 40 may be of a cylindrical structure or a rectangular structure with six surfaces, and an external structure of the battery cell 40 is not limited herein. In the embodiments of this application, the battery cell 40 is described by using an example in which the battery cell 40 is of a cylindrical structure.

Figure 4:
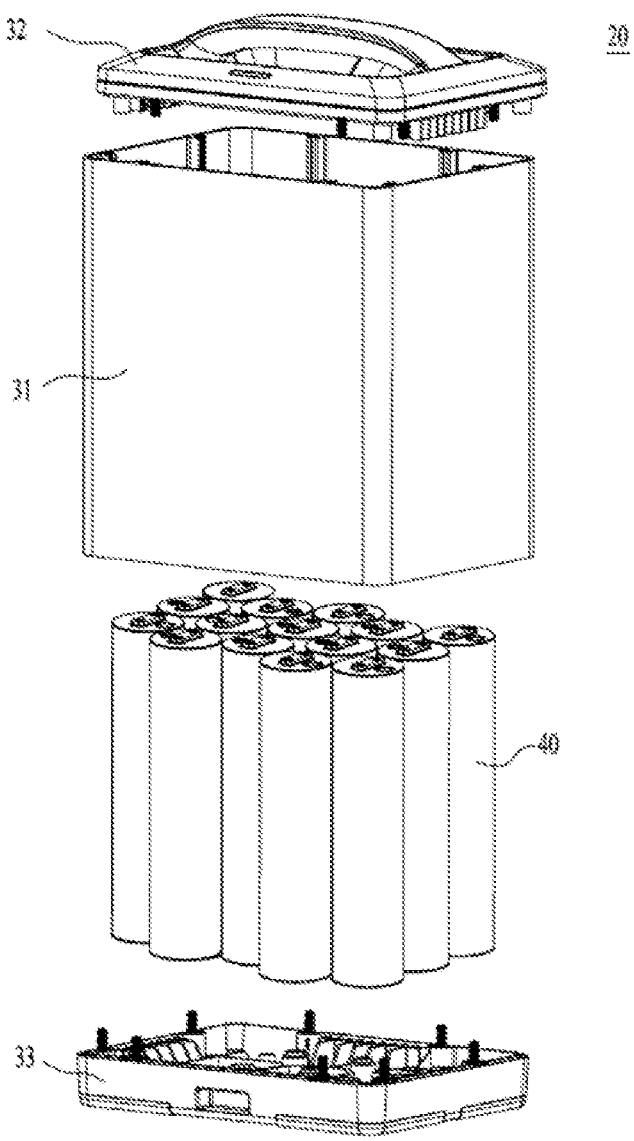
FIG. 4 is a schematic structural exploded view of a battery module disclosed in an embodiment.

As shown in FIG. 3 and FIG. 4, the battery module 20 includes a shell 30 and the battery cell 40 disposed in the shell 30. In some examples, the shell 30 includes a barrel body 31, a first cover body 32, and a second cover body 33. The first cover body 32 and the second cover body 33 are respectively disposed on two ends of the barrel body 31. The first cover body 32 and the second cover body 33 are detachably connected to the barrel body 31. For example, the first cover body 32 and the second cover body 33 are snap-connected to the barrel body 31 or connected to the barrel body 31 by using a screw. The barrel body 31, the first cover body 32, and the second cover body 33 are assembled to form an accommodating space. The battery cell 40 is disposed in the accommodating space of the shell 30.

Figure 5:
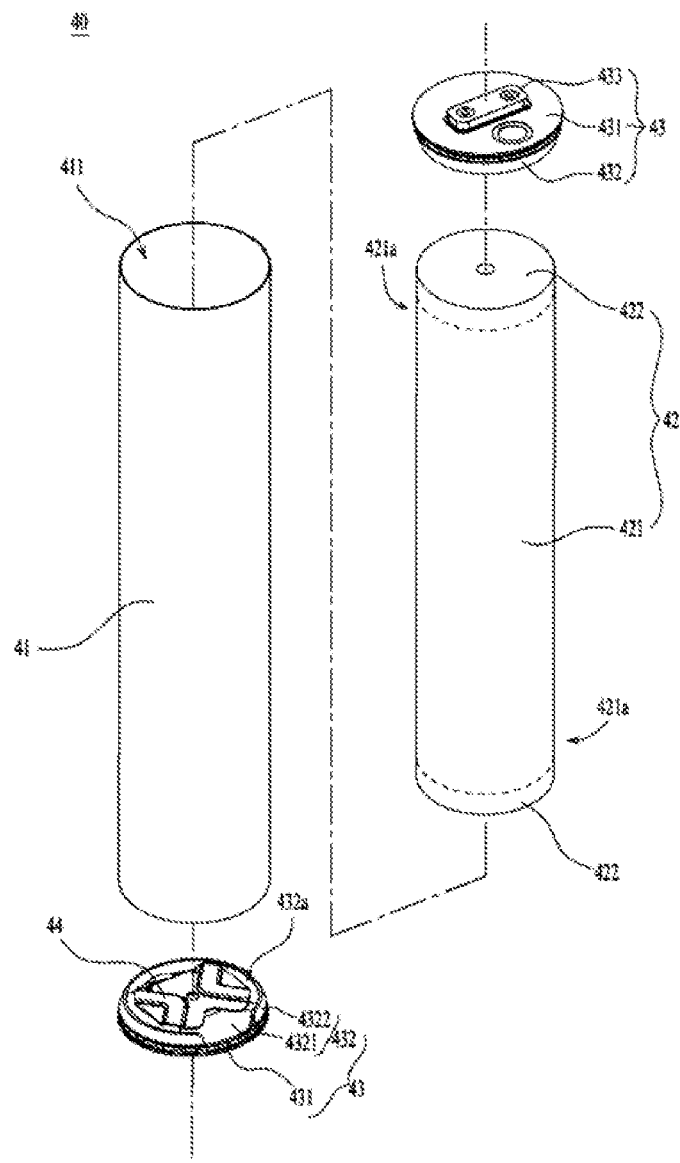
FIG. 5 is a schematic structural exploded view of a battery cell disclosed in an embodiment.

As shown in FIG. 5, the battery cell 40 in this embodiment includes a housing 41 and an electrode assembly 42 disposed in the housing 41. The housing 41 in this embodiment is of a barrel-shaped structure. The housing 41 has an inner space for accommodating the electrode assembly 42 and an electrolyte, and an opening 411 communicating with the inner space. The electrode assembly 42 may be placed into the housing 41 from the opening 411 of the housing 41. The housing 41 may be made of materials such as aluminum, aluminum alloy, or plastic. The electrode assembly 42 includes a body portion 421 and a tab 422. The body portion 421 has an end 421a. The electrode assembly 42 is disposed in the housing 41, the end 421a of the body portion 421 faces toward the opening 411 of the housing 41, and the tab 422 extends from the end 421a of the body portion 421 to the opening 411 of the housing 41.

As shown in FIG. 5, the battery cell 40 in this embodiment further includes an end cover assembly 43 and a connecting piece 44. The end cover assembly 43 is configured to cover the opening 411 of the housing 41. The end cover assembly 43 includes an end cover 431, a first insulator 432, and an electrode terminal 433. The end cover 431 is configured to cover the opening 411 of the housing 41 and is connected to the housing 41. For example, the end cover 431 may be connected to the housing 41 through welding. The first insulator 432 and the electrode terminal 433 are both disposed on the end cover 431. The first insulator 432 is disposed on a side of the end cover 431 closer to inside of the housing 41. The first insulator 432 has a concave portion 432a. The concave portion 432a is recessed from a surface of the first insulator 432 farther away from the end cover 431 toward the end cover 431, so that an opening of the concave portion faces toward the electrode assembly 42. The electrode terminal 433 is electrically connected to the electrode assembly 42 through the connecting piece 44. In some examples, a quantity of end cover assemblies 43 and a quantity of connecting pieces 44 are both 2. Each of two opposite ends of the electrode assembly 42 is correspondingly provided with one end cover assembly 43 and one connecting piece 44.

Figure 6:
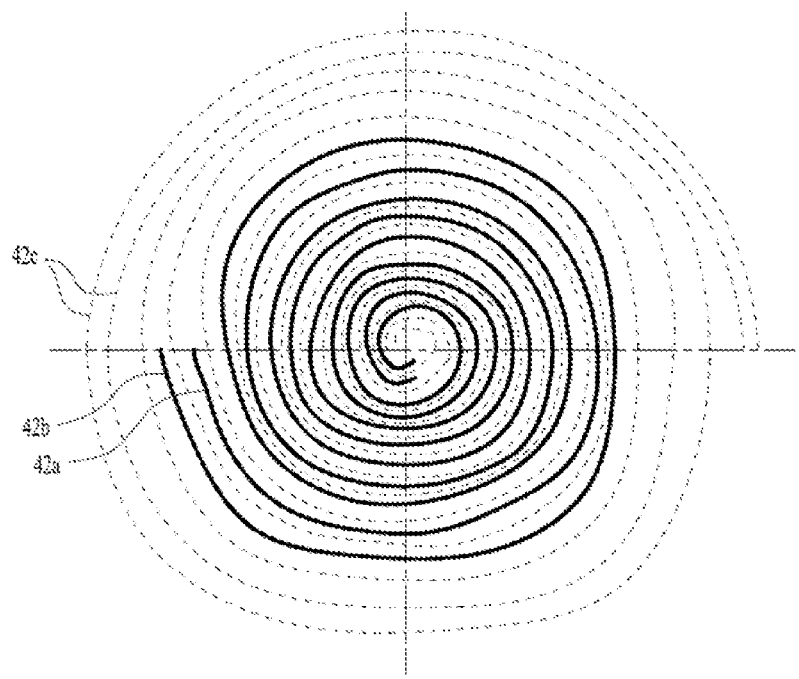
FIG. 6 is a schematic structural diagram of an electrode assembly disclosed in an embodiment.

As shown in FIG. 6, the electrode assembly 42 in this embodiment may be formed by winding a first electrode plate 42a, a second electrode plate 42b, and a separator 42c, where the separator 42c is an insulator between the first electrode plate 42a and the second electrode plate 42b. The separator 42c is configured to insulate and isolate the first electrode plate 42a from the second electrode plate 42b to prevent the first electrode plate 42a from coming into contact with the second electrode plate 42b. The first electrode plate 42a and the second electrode plate 42b each have a coated area and an uncoated area. An active material of the first electrode plate 42a is applied to the coated area of the first electrode plate 42a, and an active material of the second electrode plate 42b is applied to the coated area of the second electrode plate 42b. On the coated area, the active material is applied to a current collector formed by a metal sheet, and no active material is applied to the uncoated area. A part of the electrode assembly 42 corresponding to the coated areas of the first electrode plate 42a and the second electrode plate 42b is the body portion 421. The uncoated area of the first electrode plate 42a or the uncoated area of the second electrode plate 42b forms the tab 422. The body portion 421 has two ends 421a arranged opposite each other. The tab 422 extends from one end 421a of the body portion 421. The tab 422 is of a multi-layer structure. For example, the uncoated areas of the first electrode plate 42a are stacked to form a positive tab, and the uncoated areas of the second electrode plate 42b are stacked to form a negative tab. The positive tab and the negative tab each extend from an end 421a of the body portion 421.

In a case that the first electrode plate 42a, the second electrode plate 42b, and the separator 42c are wound together, the separator 42c alone is wound for a predetermined quantity of turns at the end of the winding process, so that the separator 42c extending beyond the first electrode plate 42a and the second electrode plate 42b can wrap the first electrode plate 42a and the second electrode plate 42b. In a direction of a winding axis of the electrode assembly 42, a size of the separator 42c is greater than a size of the coated area of the first electrode plate 42a, and also greater than a size of the coated area of the second electrode plate 42b. Therefore, in the direction of the winding axis of the electrode assembly 42, part of the separator 42c extends beyond the body portion 421, and part of the separator 42c extending beyond the body portion 421 is located on a periphery of the tab 422.

Figure 7:
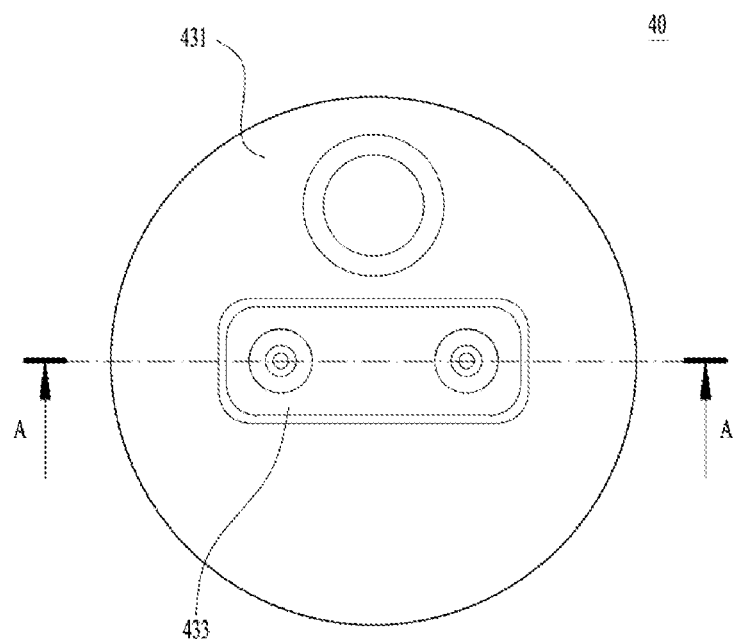
FIG. 7 is a schematic structural vertical view of a battery cell disclosed in an embodiment.
Figure 8:
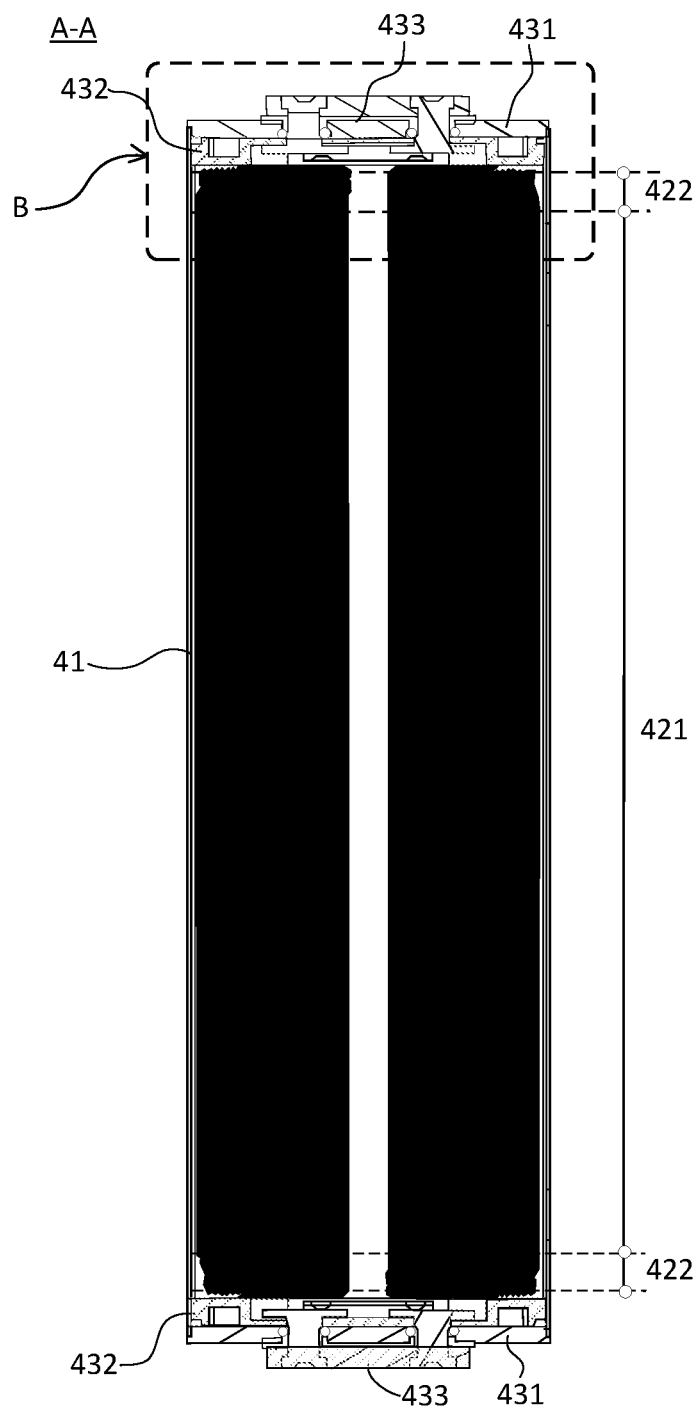

As shown in FIG. 7 and FIG. 8, the end cover 431 is connected to the housing 41 to cover the electrode assembly 42 in the housing 41. The first insulator 432 can isolate the electrode assembly 42 from the end cover 431. For example, the housing 41 has two opposite openings 411. Two end covers 431 respectively cover the two openings 411 and are both connected to the housing 41. The electrode assembly 42 has two opposite tabs 422. The two tabs 422 respectively extend from two ends 421a of the body portion 421. The two tabs 422 have opposite polarities. Two electrode terminals 433 are respectively connected to the two tabs 422. Two first insulators 432 are respectively connected to the two end covers 431.

Figure 9:
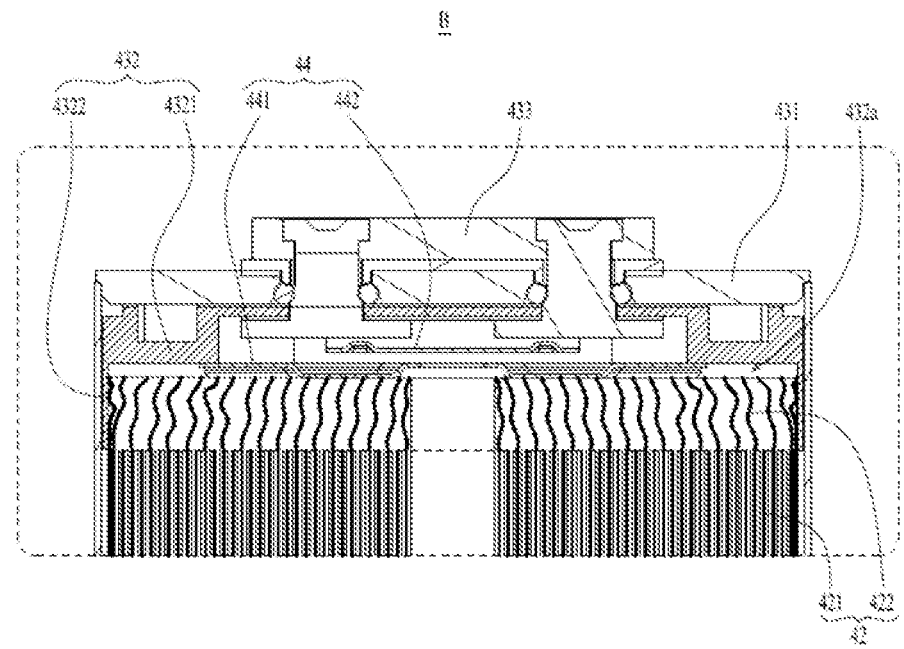
FIG. 9 is an enlarged view at B in FIG. 8.

As shown in FIG. 8 and FIG. 9, the first insulator 432 in this embodiment has the concave portion 432a. At least part of the inner wall of the concave portion 432a is disposed surrounding the periphery of the tab 422. The tab 422 extends toward inside of the concave portion 432a. The tab 422 is accommodated in the concave portion 432a of the first insulator 432, so that the first insulator 432 covers the periphery of the tab 422. An orthographic projection of a part of the tab 422 located in the concave portion 432a on the first insulator 432 is located in the concave portion 432a, that is, a peripheral surface of the part of the tab 422 located in the concave portion 432a does not extend beyond an inner wall of the concave portion 432a of the first insulator 432.

The peripheral surface of the tab 422 is a surface facing toward the housing 41. The first insulator 432 forms an isolation structure on the periphery of the tab 422 to isolate the tab 422 from the housing 41. Therefore, the tab 422 is blocked by the first insulator 432 when the tab 422 is deformed by releasing the elastic restoring force, to reduce the possibility that the tab 422 comes in to contact with the housing 41 due to the tab 422 being deformed by releasing the elastic restoring force.

In some embodiments, as shown in FIG. 9, the entire tab 422 is located in the concave portion 432a, so that the first insulator 432 can form protection for an entire tab 422.

In some embodiments, as shown in FIG. 9, the first insulator 432 is configured to abut against the peripheral surface of the tab 422 to isolate the tab 422 from the housing 41. The peripheral surface of the tab 422 faces toward the housing 41. The first insulator 432 abuts against the peripheral surface of the tab 422 to form an abutting area. In this way, the first insulator 432 abuts against the peripheral surface of the tab 422 to form the isolation structure on the periphery of the tab 422, so that the first insulator 432 isolates the tab 422 from the housing 41. In this way, during use of the battery cell 40, when the tab 422 is deformed by releasing its own elastic restoring force, if the tab 422 is in contact with the first insulator 432, the tab 422 is blocked by the first insulator 432, thereby effectively reducing the possibility of short circuit caused by the tab 422 coming into overlapping contact with the housing 41. In addition, because the first insulator 432 abuts against the peripheral surface of the tab 422, and the tab 422 is accommodated in the concave portion 432a of the first insulator 432, the tab 422 may be protected by the first insulator 432, so that a surface on which an external conductive impurity may come into contact with the tab 422 is reduced, thereby reducing the possibility of short-circuiting the tab 422 and the housing 41 due to the tab 422 and the housing 41 being conductively connected by the conductive impurity.

In some embodiments, as shown in FIG. 9, the tab 422 is flattened by using a flattening process to be compact.

In some embodiments, the first insulator 432 directly abuts against the peripheral surface of the tab 422, that is, the first insulator 432 is in direct contact with the peripheral surface of the tab 422, and no other structural members are disposed between the first insulator 432 and the peripheral surface of the tab 422.

In some embodiments, part of separator 42c is located between the first insulator 432 and the tab 422. The first insulator 432 abuts against the separator 42c, and abuts against the peripheral surface of the tab 422 through the separator 42c.

In some embodiments, as shown in FIG. 9, the first insulator 432 includes a body 4321 and an extension portion 4322 that are interconnected. The first insulator 432 is connected to the end cover 431 through the body 4321. For example, after the electrode terminal 433 is connected and fastened to the end cover 431, a part of the electrode terminal 433 is located on a side of the body 4321 farther away from the end cover 431 and applies a pressing force to the body 4321 toward the end cover 431. In this way, the first insulator 432 is connected to the end cover 431. The extension portion 4322 extends and protrudes from the body 4321 to the electrode assembly 42. The body 4321 is disposed intersecting the extension portion 4322. The body 4321 and the extension portion 4322 form the concave portion 432a. The extension portion 4322 is disposed on the periphery of the tab 422. The extension portion 4322 surrounds the peripheral surface of the tab 422. The extension portion 4322 extends along a peripheral side of the tab 422. The first insulator 432 abuts against the peripheral surface of the tab 422 through the extension portion 4322. The first insulator 432 may be connected and fastened to the end cover 431 in advance through the body 4321, and then the end cover 431 having the first insulator 432 is assembled with the housing 41. Because the first insulator 432 has the extension portion 4322, during assembling, the extension portion 4322 of the first insulator 432 can insert into a gap between the tab 422 and the housing 41, so that the extension portion 4322 can guide the tab 422 into the concave portion 432a of the first insulator 432 accurately. This reduces the possibility that the tab 422 is deformed by the first insulator 432 applying a pressing force to the tab 422 during assembling, and allows the extension portion 4322 to protect and limit the tab 422 earlier during assembling.

In some embodiments, the first insulator 432 may be of a spherical-structured cover. A surface of the first insulator 432 on which the concave portion 432a is formed is a spherical surface.

Figure 10:
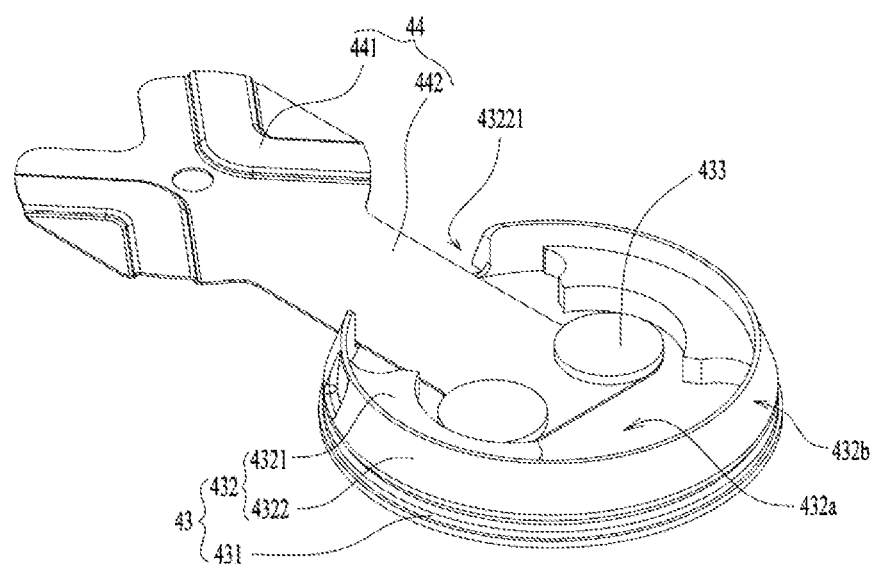
FIG. 10 is a schematic structural diagram of an end cover assembly disclosed in an embodiment.

In some embodiments, as shown in FIG. 9 and FIG. 10, the connecting piece 44 includes a first connecting portion 441 and a second connecting portion 442. The first connecting portion 441 is connected to the second connecting portion 442. The connecting piece 44 is connected to the tab 422 of the electrode assembly 42 through the first connecting portion 441. For example, the first connecting portion 441 is connected to the tab 422 through welding. The connecting piece 44 is connected to the electrode terminal 433 through the second connecting portion 442. For example, the second connecting portion 442 is connected to the electrode terminal 433 by using a rivet. As shown in FIG. 9, after the battery cell 40 is assembled, the first connecting portion 441 is in a bent state with respect to the second connecting portion 442. The first connecting portion 441 is located between the first insulator 432 and the electrode assembly 42 and is located in the concave portion 432a. The first insulator 432 and the electrode assembly 42 together press the first connecting portion 441, so that the first connecting portion 441 is not easy to move relative to the electrode assembly 42. This reduces the possibility that the first connecting portion 441 and the tab 422 are disconnected due to the first connecting portion 441 moving relative to the electrode assembly 42. In some examples, the body 4321 of the first insulator 432 and the electrode assembly 42 together press the first connecting portion 441.

In some embodiments, FIG. 10 illustratively shows a state in which the connecting piece 44 is connected to the electrode terminal 433 but the connecting piece 44 is not bent. As shown in FIG. 10, the extension portion 4322 is of an annular structure with a notch 43221, so that an end surface of the extension portion 4322 farther away from the end cover 431 is of an open-loop structure. The notch 43221 of the extension portion 4322 can avoid the second connecting portion 442. The second connecting portion 442 of the connecting piece 44 can run through the notch 43221. Therefore, during manufacturing process of the connecting piece 44, the first connecting portion 441 and the second connecting portion 442 of the connecting piece 44 remain flat, which can reduce processing steps of the connecting piece 44. Parts of the extension portion 4322 other than the notch 43221 may abut against the peripheral surface of the tab 422.

Figure 11:
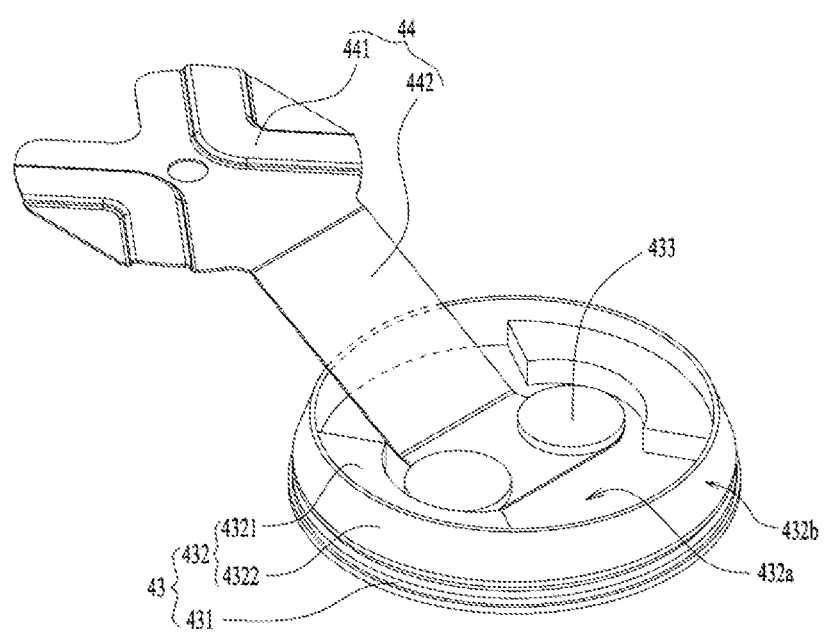
FIG. 11 is a schematic structural diagram of an end cover assembly disclosed in another embodiment.

In some embodiments, FIG. 11 illustratively shows a state in which the connecting piece 44 is connected to the electrode terminal 433 but the connecting piece 44 is not bent. As shown in FIG. 11, the extension portion 4322 is of a continuously extending closed-loop structure, so that an end surface of the extension portion 4322 farther away from the end cover 431 is of a closed-loop structure. The first connecting portion 441 and the second connecting portion 442 of the connecting piece 44 need to be bent during manufacturing. In this way, after the second connecting portion 442 is connected to the electrode terminal 433, the connecting piece 44 can avoid the extension portion 4322. The extension portion 4322 may abut against the peripheral surface of the tab 422, and because an end surface of the extension portion 4322 farther away from the end cover 431 is of a closed-loop structure, the extension portion 4322 can provide protective isolation for the tab 422, thereby isolating the tab 422 from the housing 41 at various positions in a circumferential direction of the tab 422, which can further improve the isolation effect.

Figure 12:
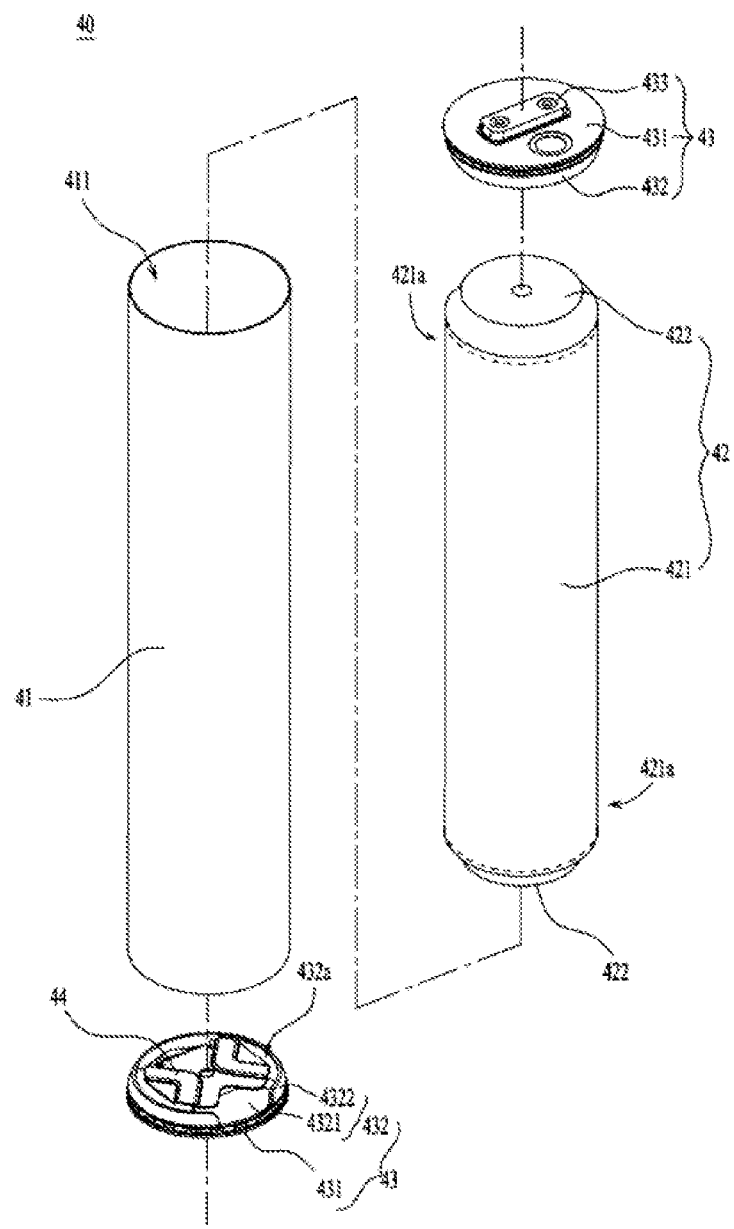
FIG. 12 is a schematic structural exploded view of a battery cell disclosed in another embodiment.
Figure 13:
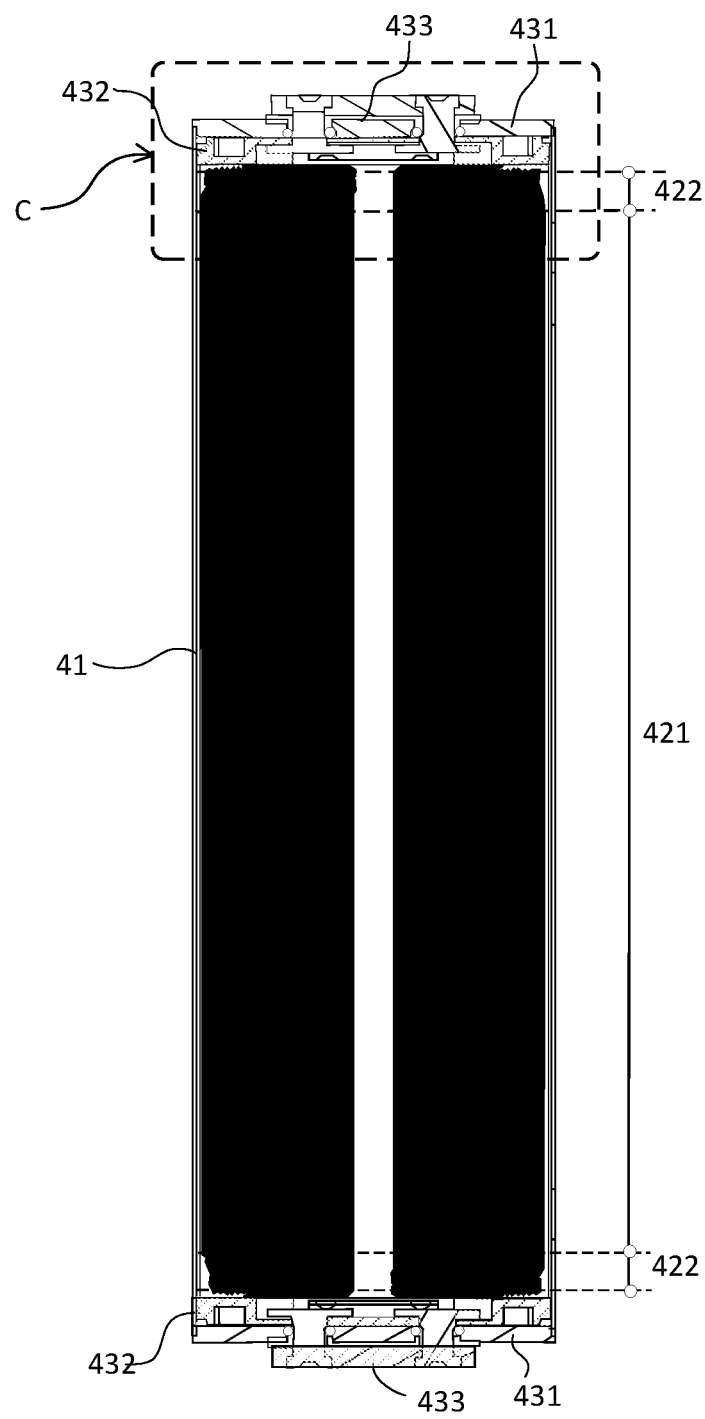
FIG. 13 is a schematic structural cross-sectional view of the battery cell in the embodiment shown in FIG. 12.
Figure 14:
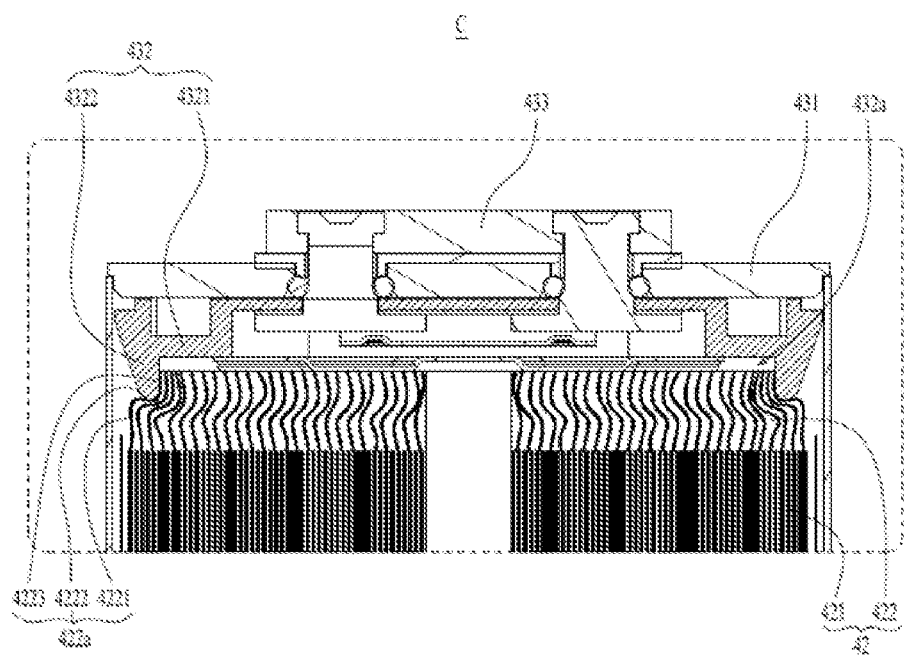
FIG. 14 is an enlarged view at C in FIG. 13.

In some embodiments, as shown in FIG. 12 to FIG. 14, the tab 422 includes a step portion 422*a*. The peripheral surface of the tab 422 includes a first area 4221, a second area 4222, and a third area 4223 that are continuous, that is, the peripheral surface of the tab 422 is a continuously extending surface. The tab 422 includes a first extension section corresponding to the first area 4221 and a second extension section corresponding to the third area 4223. The first area 4221 is closer to the body portion 421 than the second area 4222, and the third area 4223 is closer to the end cover 431 than the second area 4222. The second area 4222 connects the first area 4221 and the third area 4223. The second area 4222 is disposed facing toward the end cover 431. A minimum radial dimension of the first area 4221 is greater than a maximum radial dimension of the third area 4223. That is, a minimum radial dimension of the first extension section is greater than a maximum radial dimension of the second extension section. At least part of the inner wall of the concave portion 432*a* is disposed surrounding a periphery of the third area 4223. A part of the tab 422 corresponding to the third area 4223 is located in the concave portion 432*a*. That is, the second extension section of the tab 422 is located in the concave portion 432*a*. In this way, part of the tab 422 may be located in the concave portion 432*a* of the first insulator 432, which can shorten, for the battery cell 40 with a same capacity, an overall dimension of the battery cell 40 in an axial direction of the electrode assembly 42, thereby helping improve an energy density of the battery cell 40.

In some examples, as shown in FIG. 14, the entire tab 422 is flattened by using a flattening process to form the step portion 422*a*.

In some examples, the first insulator 432 abuts against the second area 4222. The end surface of the extension portion 4322 is opposite the second area 4222 and abuts against the second area 4222, which can reduce the possibility of the electrode assembly 42 moving in the direction approaching or leaving the end cover 431.

Figure 15:
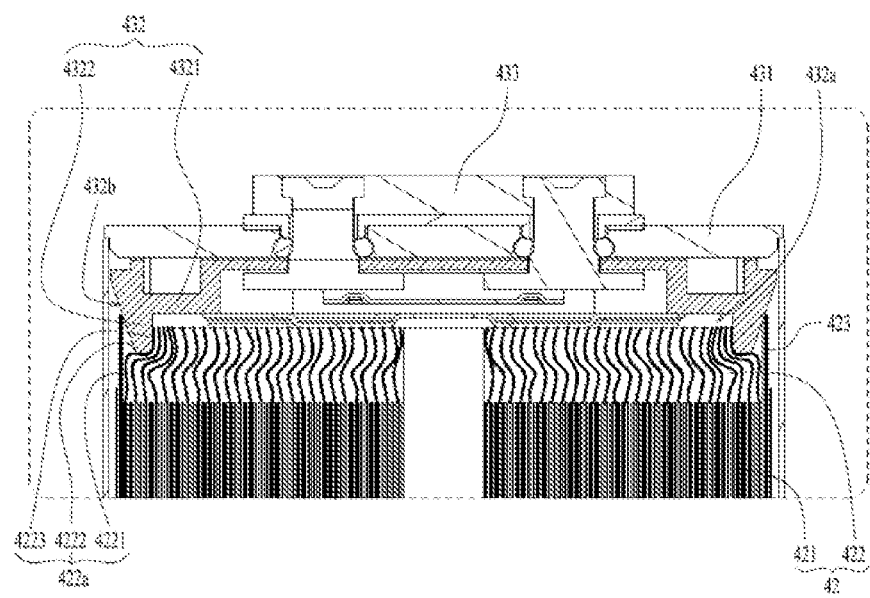
FIG. 15 is a schematic partial cross-sectional view of a battery cell disclosed in still another embodiment.

In some embodiments, as shown in FIG. 15, the electrode assembly 42 further includes a second insulator 423. The second insulator 423 is disposed surrounding an abutting area between the first insulator 432 and the tab 422 to isolate the abutting area between the first insulator 432 and the tab 422 from the housing 41. In some examples, the second insulator 423 forms an isolation structure outside the extension portion 4322 of the first insulator 432, to reduce the possibility of a conductive impurity entering the abutting area between the extension portion 4322 and the tab 422, and also forms isolation protection for the tab 422, to reduce the possibility of the tab 422 coming into contact with the housing 41 when the extension portion 4322 and the tab 422 are accidentally out of the abutting state. In this way, the extension portion 4322 and the second insulator 423 can form a structure that provides double isolation and protection for the tab 422, which can further reduce the possibility of short-circuiting the tab 422 and the housing 41 due to the tab 422 coming into contact with the housing 41. In some examples, the second insulator 423 is of an annular structure. The second insulator 423 continuously extends along a peripheral side of the extension portion 4322, to form protection in an entire circumferential direction of the extension portion 4322.

In some examples, the second insulator 423 may be a separate structural member. Two second insulators 423 are respectively disposed corresponding to two tabs 422. During assembling, the second insulator 423 needs to be assembled to the periphery of the tab 422 in advance. Then, the electrode assembly 42 with the second insulator 423 is placed into the housing 41. After the end cover assembly 43 and the housing 41 is assembled, the first insulator 432 inserts into the second insulator 423. In some examples, the second insulator 423 may be the part of the separator 42*c* extending beyond the body portion 421 and located on the periphery of the tab 422, so that no more additional second insulator 423 needs to be disposed, thereby reducing a quantity of parts used and difficulty of assembling. In addition, because the separator 42*c* is of an integral structure, the formed second insulator 423 is not easy to fall off. In this case, the separator 42*c* is located on a periphery of the first insulator 432, and the first insulator 432 directly abuts against the peripheral surface of the tab 422.

In some embodiments, as shown in FIG. 15, the first insulator 432 has an outer side surface 432*b* facing toward the housing 41. The second insulator 423 abuts against the outer side surface 432*b*, so that a contact area can be formed between the second insulator 423 and the first insulator 432. In this way, the second insulator 423 can block a conductive impurity, further reducing the possibility that the conductive impurity enters from a gap between the second insulator 423 and the first insulator 432 into a gap between the second insulator 423 and the extension portion 4322, and then enters the abutting area between the extension portion 4322 and the isolation portion 422.

In some examples, the outer side surface 432*b* of the first insulator 432 has a guide slope. The guide slope is inclined to the concave portion 432*a* in a direction leaving the end cover 431. In this way, when the electrode assembly 42 having the second insulator 423 is placed into the housing 41 and then the end cover assembly 43 is assembled, under the guidance of the guide slope, a part of the first insulator 432 corresponding to the guide slope can easily enter a space limited by the second insulator 423, which can reduce the possibility that the first insulator 432 directly abuts against the second insulator 423 to cause the second insulator 423 to collapse and further deprive the second insulator 423 of the isolation function. In an embodiment in which the first insulator 432 includes the body 4321 and the extension portion 4322, the guide slope disposed on the first insulator 432 makes an outer peripheral surface of the extension portion 4322 in a tapered shape.

In some examples, the second insulator 423 is adhered to the outer side surface 432*b* of the first insulator 432. This can improve connection reliability and stability between the second insulator 423 and the first insulator 432, and reduce the possibility that the second insulator 423 and the first insulator 432 are out of the contact state due to shock, vibration, and other operating conditions during use of the battery cell 40. For example, the second insulator 423 may be adhered to the outer side surface 432b of the first insulator 432 by using a tape or an adhesive.

Figure 16:
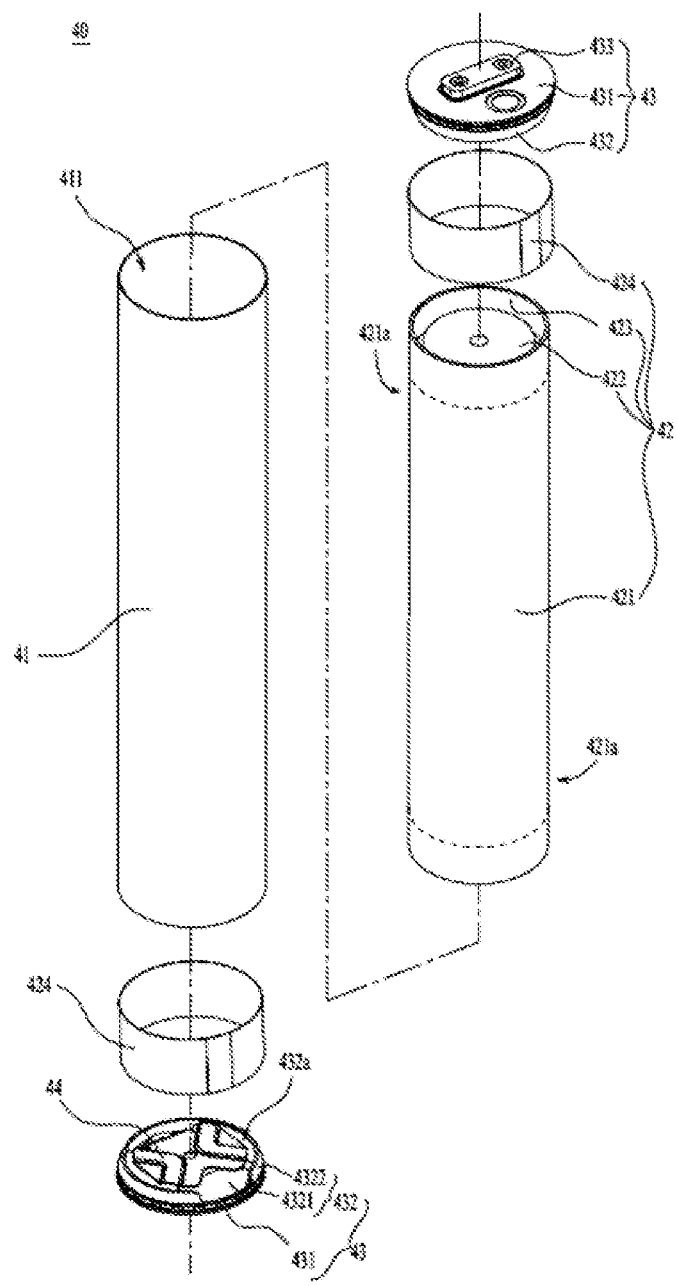
FIG. 16 is a schematic structural exploded view of a battery cell disclosed in yet another embodiment.
Figure 17:
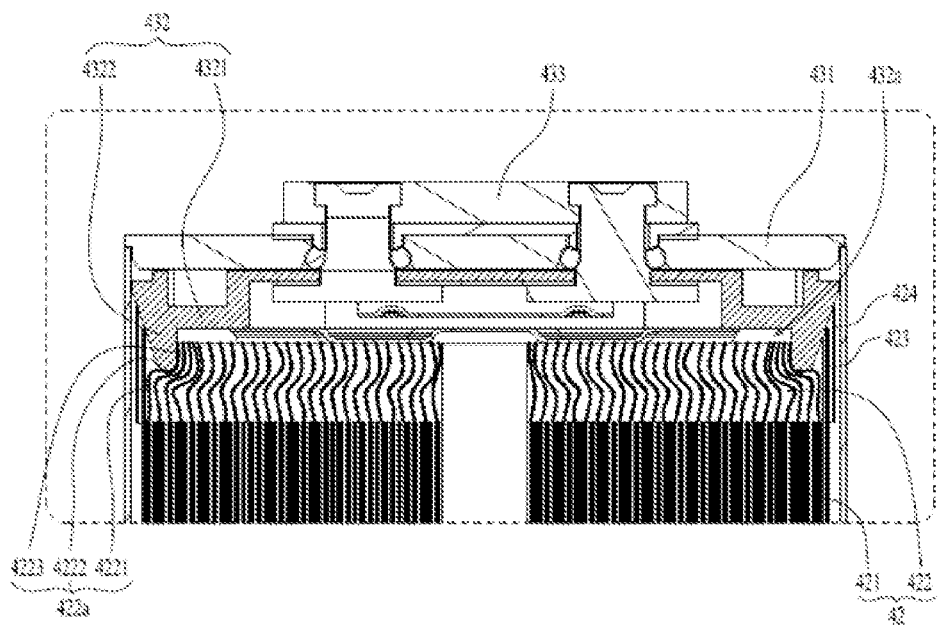
FIG. 17 is a schematic partial cross-sectional view of the battery cell in the embodiment shown in FIG. 16.

In some embodiments, as shown in FIG. 16 and FIG. 17, the battery cell 40 further includes a third insulator 424. The third insulator 424 is disposed surrounding the second insulator 423 and covers the transition area between the second insulator 423 and the outer side surface 432b. The transition area is an area in which the second insulator 423 overlaps the outer side surface 432b. The third insulator 424 may form protection for the transition area between the second insulator 423 and the outer side surface 432b. The third insulator 424 can block a conductive impurity from entering the transition area between the second insulator 423 and the outer side surface 432b, which can further reduce the possibility of the conductive impurity entering the abutting area between the extension portion 4322 and the tab 422.

In some examples, the third insulator 424 may be a separate structural member. Two third insulators 424 are respectively disposed corresponding to two tabs 422. The third insulator 424 is of a barrel-shaped structure. The third insulator 424 may be of a sheet-like structure or a tape.

In some examples, the third insulator 424 is adhered to the outer side surface 432b of the first insulator 432. This can improve connection reliability and stability between the third insulator 424 and the first insulator 432, and reduce the possibility that the third insulator 424 and the first insulator 432 are out of the contact state due to shock, vibration, and other operating conditions during use of the battery cell 40. For example, the third insulator 424 may be adhered to the outer side surface 432b of the first insulator 432 by using a tape or an adhesive.

The battery cell 40 in the Embodiments includes the electrode assembly 42 having the tab 422 and the first insulator 432 having the concave portion 432a. After the battery cell 40 is assembled, the tab 422 is accommodated in the concave portion 432a, and the first insulator 432 abuts against the peripheral surface of tab 422, so that the first insulator 432 can isolate the tab 422 from the housing 41. In this way, during use of the battery cell 40, in a case that the tab 422 is deformed by releasing the elastic restoring forces accumulated by itself, the tab 422 is limited and constrained by the first insulator 432, so that the tab 422 is not easy to come into contact with the housing 41 due to springing back, thereby reducing the possibility of short circuit of the battery cell 40 caused by the tab 422 coming into contact with the housing 41.

Based on the battery cell 40 in the foregoing embodiments, an embodiment further provides a manufacturing method of the battery cell 40, including:

providing the electrode assembly 42, where the electrode assembly 42 includes the first electrode plate 42a, the second electrode plate 42b, and the separator 42c, the first electrode plate 42a and the second electrode plate 42b each have a coated area and an uncoated area, a part of the electrode assembly 42 corresponding to the coated areas of the first electrode plate 42a and the second electrode plate 42b is the body portion 421, the uncoated area of the first electrode plate 42a or the second electrode plate 42b forms the tab 422, and the separator 42c is configured to isolate the first electrode plate 42a from the second electrode plate 42b;

placing the electrode assembly 42 into the housing 41 having the opening 411, where the tab 422 extends from the end 421a of the body portion 421 to the opening 411; and assembling the end cover assembly 43 having the end cover 431 and the first insulator 432 with the housing 41, where the end cover 431 covers the opening 411 and is connected to the housing 41, the first insulator 432 is located on a side of the end cover 431 closer to inside of the housing 41, the first insulator 432 has the concave portion 432a, the tab 422 is accommodated in the concave portion 432a, and at least part of an inner wall of the concave portion 432a is disposed surrounding a periphery of the tab 422.

In some embodiments, the first insulator 432 abuts against the peripheral surface of tab 422.

Figure 18:
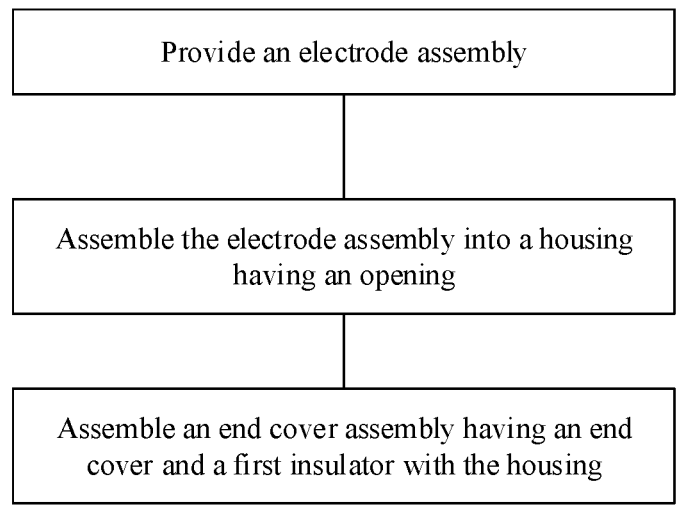
FIG. 18 is a flowchart of a manufacturing method of battery cell according to an embodiment.

As shown in FIG. 18, according to the battery cell 40 manufactured by using the manufacturing method of the battery cell 40 in this embodiment, the electrode assembly 42 having the body portion 421 and the tab 422 is placed into the housing 41, and the tab 422 faces toward the opening 411 of the housing 41. The end cover assembly 43 that includes the end cover 431 and the first insulator 432 with the concave portion 432a is assembled with the housing 41. The tab 422 is accommodated in the concave portion 432a of the first insulator 432. At least part of the inner wall of the concave portion 432a is disposed surrounding the periphery of the tab 422. According to a structural design in which the first insulator 432 isolates the tab 422 from the housing 41, during use of the battery cell 40, when the tab 422 is deformed by releasing the elastic restoring forces accumulated by itself, the tab 422 is limited and constrained by the first insulator 432, so that the tab 422 is not easy to come into contact with the housing 41, thereby reducing the possibility of short circuit of the battery cell 40 caused by the tab 422 coming into contact with the housing 41.

Figure 19:
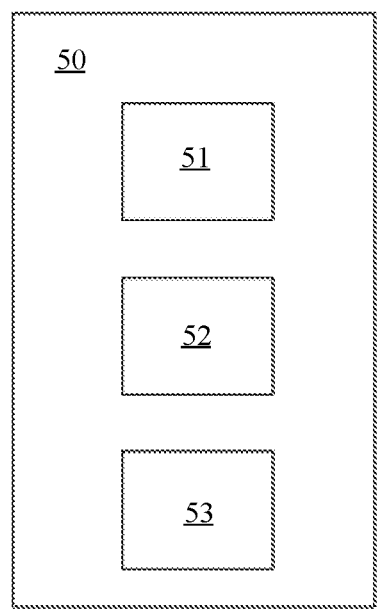
FIG. 19 is a schematic diagram of a manufacturing system of battery cell according to an embodiment.

As shown in to FIG. 19, based on the battery cell 40 in the foregoing embodiments, an embodiment further provides a manufacturing system 50 of the battery cell 40, including:

a first assembling 51, configured to provide the electrode assembly 42, where the electrode assembly 42 includes the first electrode plate 42a, the second electrode plate 42b, and the separator 42c, the first electrode plate 42a and the second electrode plate 42b each have a coated area and an uncoated area, a part of the electrode assembly 42 corresponding to the coated areas of the first electrode plate 42a and the second electrode plate 42b is the body portion 421, the uncoated area of the first electrode plate 42a or the second electrode plate 42b forms the tab 422, and the separator 42c is configured to isolate the first electrode plate 42a from the second electrode plate 42b;

a second assembling apparatus 52, configured to placing the electrode assembly 42 into the housing 41 having the opening 411, where the tab 422 extends from the end 421a of the body portion 421 to the opening 411; and a third assembling apparatus 53, configured to assemble the end cover assembly 43 having the end cover 431 and the first insulator 432 with the housing 41, where the end cover 431 covers the opening 411 and is connected to the housing 41, the first insulator 432 is located on a side of the end cover 431 closer to inside of the housing 41, the first insulator 432 has the concave portion 432a, the tab 422 is accommodated in the concave portion 432a, and at least part of an inner wall of the concave portion 432a is disposed surrounding a periphery of the tab 422.

Although this application has been described with reference to the preferred embodiments, various modifications can be made to this application without departing from the scope of this application and the components therein can be replaced with equivalents. In particular, as long as there is no structural conflict, the various technical features mentioned in the embodiments can be combined in any manner. This application is not limited to the specific embodiments disclosed in this specification, but includes all technical solutions falling within the scope of the claims.

What is claimed is:

1. A battery cell, comprising:
   a housing, providing an opening;
   an electrode assembly, disposed in the housing, wherein the electrode assembly comprises a body portion and a tab, the tab extending from an end of the body portion to the opening, the electrode assembly comprising a first electrode plate, a second electrode plate, and a separator,
   the first electrode plate and the second electrode plate each having a coated area and an uncoated area;
   an end cover assembly, configured to cover the opening, wherein the end cover assembly comprises an end cover and a first insulator, the end cover is configured to cover the opening and is connected to the housing, the first insulator is disposed on a side of the end cover closer to inside of the housing, the first insulator has a concave portion, the tab is accommodated in the concave portion, and at least part of an inner wall of the concave portion is disposed surrounding a periphery of the tab; and,
   a connecting piece comprising a first connecting portion and a second connecting portion, wherein, the first connecting portion is located between the first insulator and the electrode assembly and is located in the concave portion; and, wherein
      a part of the electrode assembly corresponding to the coated areas of the first electrode plate and the second electrode plate is the body portion,
      the uncoated area of the first electrode plate or the second electrode plate forms the tab, and
      the separator is configured to isolate the first electrode plate from the second electrode plate; and, wherein
   the electrode assembly further comprises a second insulator, and the second insulator is disposed surrounding an abutting area between the first insulator and the tab to isolate the abutting area from the housing;
   wherein the second insulator abuts against an outer side surface of the first insulator facing toward an outer side surface of the housing; and
   the battery cell further comprises a third insulator, the third insulator is disposed surrounding the second insulator and covers a transition area between the second insulator and the outer side surface.

2. The battery cell according to claim 1, wherein the first insulator is configured to abut against a peripheral surface of the tab.

3. The battery cell according to claim 2, wherein the first insulator comprises a body and an extension portion that are interconnected, wherein the body is configured to be connected to the end cover, the extension portion extends and protrudes from the body to the electrode assembly to form the concave portion, the extension portion is disposed on the periphery of the tab, and the extension portion abuts against the peripheral surface of the tab.

4. The battery cell according to claim 3, wherein the extension portion surrounds the peripheral surface of the tab, and the extension portion is of a continuously extending closed-loop structure or an annular structure with a notch.

5. The battery cell according to claim 1, wherein the peripheral surface comprises a first area, a second area, and a third area that are continuous, wherein the first area is closer to the body portion than the second area, the second area connects the first area and the third area, a minimum radial dimension of the first area is greater than a maximum radial dimension of the third area, and at least one part of the inner wall of the concave portion surrounds the third area.

6. The battery cell according to claim 5, wherein the first insulator is configured to abut against the second area.

7. The battery cell according to claim 1, wherein the second insulator is a part of the separator extending beyond the body portion and located on the periphery of the tab.

8. The battery cell according to claim 1, wherein the outer side surface has a guide slope, and the guide slope is inclined to the concave portion in a direction leaving the end cover.

9. The battery cell according to claim 1, wherein the second insulator is adhered to the outer side surface.

10. A battery, comprising the battery cell of claim 1.

11. An electric apparatus, comprising the battery cell of claim 1, wherein the battery cell is configured to supply electric energy.

12. A manufacturing method of battery cell, comprising:
    providing an electrode assembly, wherein the electrode assembly comprises a first electrode plate, a second electrode plate, and a separator, wherein the first electrode plate and the second electrode plate each has a coated area and an uncoated area, a part of the electrode assembly corresponding to the coated areas of the first electrode plate and the second electrode plate is a body portion, the uncoated area of the first electrode plate or the second electrode plate forming a tab, and the separator being configured to isolate the first electrode plate from the second electrode plate;
    placing the electrode assembly into a housing having an opening, wherein the tab extends from an end of the body portion to the opening; and
    assembling an end cover assembly having an end cover and a first insulator with the housing, wherein the end cover covers the opening and is connected to the housing, the first insulator is located on a side of the end cover proximate to an inside of the housing, the first insulator has a concave portion, the tab is accommodated in the concave portion, and at least part of an inner wall of the concave portion is disposed surrounding a periphery of the tab, wherein the battery cell comprises a connecting piece comprising a first connecting portion and a second connecting portion, wherein, the first connecting portion is located between the first insulator and the electrode assembly and is located in the concave portion; and, wherein
    the electrode assembly further comprises a second insulator, and the second insulator is disposed surrounding an abutting area between the first insulator and the tab to isolate the abutting area from the housing;
    wherein the second insulator abuts against an outer side surface of the first insulator facing toward an outer side surface of the housing; and
    the battery cell further comprises a third insulator, the third insulator is disposed surrounding the second insulator and covers a transition area between the second insulator and the outer side surface.

13. The manufacturing method of battery cell according to claim 12, wherein the first insulator abuts against a peripheral surface of the tab.

14. A manufacturing system of battery cell, comprising:
    a first assembling apparatus, configured to provide an electrode assembly, wherein the electrode assembly comprises a first electrode plate, a second electrode plate, and a separator, wherein the first electrode plate and the second electrode plate each has a coated area and an uncoated area, a part of the electrode assembly corresponding to the coated areas of the first electrode plate and the second electrode plate being a body portion, the uncoated area of the first electrode plate or the second electrode plate forming a tab, and the separator being configured to isolate the first electrode plate from the second electrode plate;

a second assembling apparatus, configured to place the electrode assembly having the body portion and the tab into a housing having an opening, wherein the tab extends from an end of the body portion to the opening; and a third assembling apparatus, configured to assemble an end cover assembly having an end cover and a first insulator with the housing, wherein the end cover covers the opening and is connected to the housing, the first insulator is located on a side of the end cover closer to inside of the housing, the first insulator has a concave portion, the tab being accommodated in the concave portion, and at least one part of an inner wall of the concave portion being disposed surrounding a periphery of the tab, wherein the battery cell comprises a connecting piece comprising a first connecting portion and a second connecting portion, wherein, the first connecting portion is located between the first insulator and the electrode assembly and is located in the concave portion; and, wherein the electrode assembly further comprises a second insulator, and the second insulator is disposed surrounding an abutting area between the first insulator and the tab to isolate the abutting area from the housing;

wherein the second insulator abuts against an outer side surface of the first insulator facing toward an outer side surface of the housing; and the battery cell further comprises a third insulator, the third insulator is disposed surrounding the second insulator and covers a transition area between the second insulator and the outer side surface.

* * * * *